US012447824B2

(12) United States Patent
Haberjahn

(10) Patent No.: US 12,447,824 B2
(45) Date of Patent: Oct. 21, 2025

(54) METHOD FOR DISPLAYING AUGMENTED REALITY INFORMATION IN VEHICLES

(71) Applicant: Joynext GmbH, Dresden (DE)

(72) Inventor: Mathias Haberjahn, Dresden (DE)

(73) Assignee: JOYNEXT GmbH, Dresden (DE)

(*) Notice: Subject to any disclaimer, the term of this patent is extended or adjusted under 35 U.S.C. 154(b) by 274 days.

(21) Appl. No.: 18/098,152

(22) Filed: Jan. 18, 2023

(65) Prior Publication Data
US 2023/0234442 A1   Jul. 27, 2023

(30) Foreign Application Priority Data
Jan. 27, 2022  (DE) .......................... 102022101893.8

(51) Int. Cl.
*B60K 35/28*  (2024.01)
*B60K 35/10*  (2024.01)
(Continued)

(52) U.S. Cl.
CPC .............. *B60K 35/28* (2024.01); *B60K 35/22* (2024.01); *B60K 35/29* (2024.01); *B60K 35/60* (2024.01);
(Continued)

(58) Field of Classification Search
CPC ........ B60K 35/00; B60K 35/10; B60K 35/23; B60K 35/28; B60K 2360/149; B60K 2360/177; G02B 27/0101
See application file for complete search history.

(56) References Cited

U.S. PATENT DOCUMENTS

| 11,482,141 B1* | 10/2022 | Wells ................. G02B 27/0093 |
| 2014/0268353 A1* | 9/2014 | Fujimura ........... G02B 27/0101 |
| | | 359/630 |

(Continued)

FOREIGN PATENT DOCUMENTS

| DE | 102007058437 A1 | 6/2009 |
| DE | 102012022691 A1 | 5/2014 |

(Continued)

OTHER PUBLICATIONS

EPO machine translation of DE-102018201768-A description. (Year: 2018).*

(Continued)

*Primary Examiner* — Navid Z. Mehdizadeh
*Assistant Examiner* — Shelley Marie Osterhout
(74) *Attorney, Agent, or Firm* — Manelli Selter PLLC; Edward Stemberger

(57) ABSTRACT

Preferably, after a displaying of the ambient object, a renewed detection of the occupant's current viewing direction is temporarily deactivated or can be deactivated (also for a limited time or permanently switchable). This allows the occupant to view and evaluate the displayed augmented reality information in detail. Deactivation can also be performed, for example, by a digital or analog switching element, via gesture or voice control, and depending on the situation (examples of corresponding situation-dependent parameters are listed above) for a certain time. On the other hand, however, a call-up control of the display can also be achieved via the deactivation function. A displaying of the enlarged and/or magnified surrounding object takes place accordingly always only if the function was activated accordingly before. In this respect, a time-limited or general activation of the expanded and/or magnified display of environment objects can also be performed.

5 Claims, 2 Drawing Sheets

(51) Int. Cl.
*B60K 35/22* (2024.01)
*B60K 35/29* (2024.01)
*B60K 35/60* (2024.01)

(52) U.S. Cl.
CPC ........ *B60K 35/10* (2024.01); *B60K 2360/149* (2024.01); *B60K 2360/177* (2024.01)

(56) References Cited

U.S. PATENT DOCUMENTS

| | | | | |
|---|---|---|---|---|
| 2016/0004076 A1* | 1/2016 | Matsubara | ........... | G01C 21/365 |
| | | | | 345/7 |
| 2016/0098861 A1* | 4/2016 | Sisbot | ................. | G06V 20/597 |
| | | | | 345/633 |
| 2016/0342205 A1* | 11/2016 | Shigeta | ................ | G06V 40/197 |
| 2021/0070176 A1* | 3/2021 | Rao | ......................... | G06F 3/013 |
| 2021/0323410 A1* | 10/2021 | Huber | .................... | G02B 5/045 |

FOREIGN PATENT DOCUMENTS

| | | | | | |
|---|---|---|---|---|---|
| DE | 102014211803 | A1 | | 6/2015 | |
| DE | 102018201768 | A1 | * | 8/2019 | ............. B60K 35/00 |
| DE | 102018201768 | B4 | | 8/2019 | |

OTHER PUBLICATIONS

Examination Report in DE 10 2022 101 893.8 dated Dec. 1, 2022 and English Translation thereof.

* cited by examiner

METHOD FOR DISPLAYING AUGMENTED REALITY INFORMATION IN VEHICLES

The present invention relates to a method for displaying augmented reality information in vehicles. In particular, the invention relates to a method for displaying an augmentation on a windshield of a vehicle while taking into account a current viewing direction of an occupant.

BACKGROUND

Driver monitoring systems (DMS), which are capable of continuously recording and assessing the driver's condition and state, are increasingly being installed in vehicles. Furthermore, augmented reality (AR) systems, which can superimpose additional information from the vehicle environment on the driver's view or on a video from a front camera, are now state of the art. By displaying information directly and contextually, driver distraction can be reduced. This can lead to a significant increase in driving safety. In addition, novel driving assistance and infotainment functions can be created and existing functions can be enhanced by AR visualization. Here, a direct display on a vehicle windshield as a head-up display (HUD) is preferred over, for example, possible overlays on an additional display due to the available display area.

However, it is important to sensibly limit the amount and type of information displayed, so that the driver can continue to follow the surrounding traffic situation. Although increasing automation of the traffic flow will reduce the need for active driving monitoring in the future, the driver of the vehicle (or its other occupants) should still be able to view the surroundings through the windshield without interference despite the augmented reality information displayed. In order to reduce the amount of possible augmented reality information sensibly or to be able to interact with the given scenery, direct feedback from the driver's point of view can be used. For this purpose, sensors of a DMS can be used to record the direction of the driver's gaze ("eye tracking") in order to adjust the positioning of the Augmented Reality information displayed. In this way, for example, driving direction information can be adapted to a changed viewing direction.

However, with increasing density of the information displayed, it can also easily lead to distraction of the driver or the other occupants. Augmentation (superimposition) could also obstruct the driver's unobstructed view of the surroundings. Augmentation can also result in a narrowing of the free field of vision so that real objects in the environment can be perceived more poorly or their observation is made more difficult by the augmentation.

It is therefore a task of the present invention to provide a method for displaying augmented reality information in vehicles, which can reasonably limit the amount and type of information displayed, largely avoids driver distraction and can compensate for a narrowing of the free field of view.

SUMMARY

One aspect of the present invention relates to a method for displaying augmented reality information in vehicles, wherein augmentation is performed on a windshield of the vehicle, comprising preparing augmented reality information for display on the windshield, detecting the current viewing direction of an occupant with respect to the windshield, defining a clearing area of the windshield around the current viewing direction, and displaying the prepared augmented reality information taking into account the defined clearing area.

Augmented reality information is understood to be all types of information suitable for a corresponding display. This can be information that can be directly assigned to the respective driving situation (e.g., current speed or maximum permissible speed, warnings or signs, highlights from the surroundings), general traffic information (e.g., weather, traffic and congestion information, route information), general augmentations about the surroundings (e.g., tourist information and recommendations) or other infotainment data.

A processing of augmented reality information for display on the windshield can in particular comprise the compilation and adaptation of the information intended for display to the type of display used. For this purpose, for example, a situation-dependent filtering and adaptation of the available information width as well as a selection of a displaying form particularly suitable for the displaying on the windshield can take place. Depending on the situation, an indication of slippery conditions could be provided, for example, by a simple displaying as a snowflake pictogram or as a complex displaying with temperature information. In addition, the preparation of augmented reality information can also include how the information on the windshield is arranged as optimally as possible on the windshield.

A detection of the current viewing direction of an occupant with respect to the windshield can be carried out in particular via a strain gauge already present in the vehicle or a sensor additionally provided for this purpose. Detecting the current line of sight of an occupant is part of the state of the art and enables in particular to determine the point of intersection of the current line of sight of the occupant with the windshield. An occupant may in particular be the driver of the vehicle, but the method according to the invention is also applicable to any other occupant of the vehicle.

Determining the intersection of the occupant's current line of vision with the windshield makes it possible to define a clearing area of the windshield around the current line of vision. A clearing area is defined as an area on the windshield that is intended to provide the clearest possible view through the windshield or to be kept clear of augmentations that are considered insignificant. Preferably, no augmented reality information is presented in the clearance area, or only in dimmed form.

However, due to its clearance, the clearance area is also ideal for displaying particularly safety-relevant information or information that is otherwise classified as relevant. In this respect, the clearance area can be regarded as a display area that changes position and has a particular need to remain free and is given a high priority. Thus, information categorized as non-essential (e.g. news or general weather information) is preferably always displayed outside the clearance area, while e.g. warnings about traffic events can be displayed in the otherwise preferably transparent or at least predominantly transparent clearance area.

Preferably, the clearance area of the windshield around the current viewing direction has a general or viewing direction-dependent size and/or shape, or these values are determined on the basis of external parameters depending on the situation. The size of the clearance area can thus also be adjusted depending on the situation (e.g. depending on a day or night operation). Preferably, the size of a circular clearance area on the front screen is 2° solid angle around the respective viewing direction vector, more preferably 5° solid angle and even more preferably 10° solid angle. However, the shape may deviate from a simple circular shape, particularly in the peripheral areas of the front screen. A roughly pear-shaped design of the clearance area would be useful, for example, for keeping the view of the route immediately in front of the vehicle clear, whereby the width of the clearance area can be reduced in the upper part of the clearance area compared to the lower part.

Displaying the prepared augmented reality information taking into account the defined clearance area means that the information intended for display on the windshield after processing augmented reality information is still adapted to the previously defined clearance area with regard to its mutual arrangement before display, so that this is also reproduced on the windshield in the display. A displaying can take place, for example, via a corresponding projection on the front screen or via an active display device on the front screen. A windshield can also be a virtual windshield in the form of a display that simulates the function of a real windshield.

Preferably, the detection of the current viewing direction of an occupant and/or the definition of a clearance area of the windshield can be deactivated. In addition to the general deactivation of the method according to the embodiment of invention, this has the particular purpose that in the case of temporary deactivation, for example, a current display of the prepared augmented reality information can be displayed permanently and without further adaptation to the current viewing direction. Deactivation can take place, for example, by a digital or analog switching element, via gesture or voice control, as well as situation-dependent for a certain time. In addition to the traffic situation in the vehicle's environment, situation-dependent parameters also include personal parameters of the driver (e.g., the driver's heart rate recorded by a smart watch) or certain vehicle parameters (e.g., steering angle, lateral acceleration, braking deceleration, etc.), which are recorded by an in-vehicle monitoring system (IVMS), for example. Deactivating the detection of an occupant's current line of sight also has the advantage that a corresponding sensor for detecting can also be deactivated.

Preferably, after the detection of the current viewing direction, a determination of an ambient object located in the current viewing direction is carried out for an expanded and/or enlarged display as augmented reality information. For this purpose, information from sensors that are imaging (camera) or non-imaging (laser scanner) and operate in the visible or non-visible range (IR) can be used to determine the ambient objects.

For example, a detected line of sight (also referred to as a line of sight vector) can be transferred to an appropriately set up computing unit and transformed into the vehicle's coordinate system. Subsequently, with the aid of perceptive sensors (camera, lidar, radar) or other external data sources, such as cloud services or road maps, a current three-dimensional map of the surroundings with respect to the vehicle can be generated and continuously updated (creation of a map of the surroundings). The computing unit can then project the relative gaze direction vector of the occupant into the respective current environment map and determine the most likely intersection with an object visible to the driver, i.e., the most likely interaction object (e.g., via ray tracing). By knowing the interaction object, further actions can subsequently be taken.

For example, detailed information about the interaction object, such as gas station prices when determining an interaction object gas station, can be displayed for an enhanced display, or the augmentation logic can be controlled to prepare augmented reality information. Also or additionally possible is an enlarged display of the previously determined interaction object detected via the environment sensors. A passenger of the vehicle can thus be shown views of the outside world that are difficult to see or recognize enlarged by a superimposed zoom display on the windshield if required. Examples include distant road signs, traffic signs or license plates.

For an enlarged display, for example, a corresponding zoom radius can be defined in the image area of an assigned detection camera. The zoom radius can be adaptively adjusted to the distance of the real objects to be imaged. Preferably, a magnifying mapping transformation is applied to the zoom area so that the transition from un-magnified to magnified image content can be calculated continuously (steadily). The transformed zoom area can then be transferred to the front screen to contact-analog display and accordingly create the impression of a seamless magnification of reality in the viewing area. The magnified displaying thus fits optimally into the other displaying or an environment viewed directly through the front screen.

Preferably, the ambient object is displayed as augmented reality information within the clearance area, within a surrounding area located in the vicinity of the clearance area or on a screen. The selection of a corresponding area can be made in particular from an assigned relevance of the respective information, situation-dependent (examples of corresponding situation-dependent parameters are listed above), or dependent on concrete displaying wishes of the occupant. A present display within the clearance area can be made in particular to display information that is particularly relevant to safety. A solid angle range around the respective viewing direction vector from the maximum solid angle extension of the clearance range up to 2 times, more preferably 3 times and even more preferably 4 times the solid angle extension is considered to be the environment of the clearance range. For a wide area of clearance, the surrounding area can also extend to the entire front window. Particularly preferably, the surrounding area lies within the respective peripheral field of view of the occupant, which is dependent on the viewing direction.

Preferably, after a displaying of the ambient object, a renewed detection of the occupant's current viewing direction is temporary deactivated or can be deactivated (also for a limited time or permanently switchable). This allows the occupant to view and evaluate the displayed augmented reality information in detail. Deactivation can also be performed, for example, by a digital or analog switching element, via gesture or voice control, and depending on the situation (examples of corresponding situation-dependent parameters are listed above) for a certain time. On the other hand, however, a call-up control of the display can also be achieved via the deactivation function. A displaying of the enlarged and/or magnified surrounding object takes place accordingly always only if the function was activated accordingly before. In this respect, a time-limited or general activation of the expanded and/or magnified display of environment objects can also be performed.

Preferably, the displaying of the ambient object largely masks reality by means of brightness and optional color enhancement or contouring. This makes it possible to replace the "real" ambient object in the direction of the occupant's gaze with a corresponding magnified displaying. In combination with a seamless magnification of the reality in the field of view, objects in the environment can thus be magnified without the magnification being immediately recognized as such by the occupant.

Thus, a main idea of the present invention is to enable a gaze-direction controlled interaction between an occupant of the vehicle (in particular the driver) and an augmentation system, in which the amount and type of information displayed can be reasonably limited, a distraction of the driver can be largely avoided, and a narrowing of the free field of view can be compensated.

By knowing the current viewing direction, augmentations in the central viewing area of the occupant can be suppressed. In particular, general overlays on the windshield can be permitted exclusively in the outer peripheral field of view, for example. This can ensure that the driver of the vehicle in particular can perform his or her driving task at all times and that no safety-relevant information is obscured/augmented. This enables less distraction of the occupant through targeted peripheral augmentation.

The determination of an ambient object lying in the current line of sight and its expanded and/or enlarged display as augmented reality information enables it to be displayed directly in the driver's field of vision in particular, which means that it can be merged with the real driver's perception. In addition, there is less distraction from the traffic situation compared to the observation of an additional display or another display element.

A further aspect of the present invention relates to a system for displaying augmented reality information on a windshield of vehicles, set up for carrying out the method according to the invention described above, comprising a sensor, designed to detect the current viewing direction of an occupant with respect to the windshield; a computing unit, designed to process augmented reality information and to define and take into account an clearance area around the current viewing direction; and a displaying unit, set up to display augmented reality information on the windshield.

A sensor for detecting the direction of gaze can preferably be a component of an existing strain gage (e.g. camera, TOF sensor) or of another system set up accordingly. However, the direction of gaze can also be detected by an additional or exclusive sensor.

Preferably, the computing unit is also designed to use external sensor data to determine an ambient object in the line of sight and to process it for an expanded and/or enlarged display as augmented reality information.

The system is set up for carrying out the method according to the embodiment of invention. The features mentioned for the system therefore arise directly as components required for carrying out the process according to the embodiment of invention. In this respect, reference is made in each case to the corresponding explanations of the process with regard to their specific function, the respective technical effects and the advantages and specific embodiments resulting therefrom according to the embodiment of invention.

Further preferred embodiments of the invention result from the features mentioned in the sub claims.

The various embodiments of the invention mentioned in this application can be advantageously combined with each other, unless otherwise specified in the individual case.

BRIEF DESCRIPTION OF THE DRAWINGS

The invention is explained below in embodiment examples with reference to the accompanying drawing, wherein.

DETAILED DESCRIPTION OF EXAMPLE EMBODIMENTS

Figure 1:
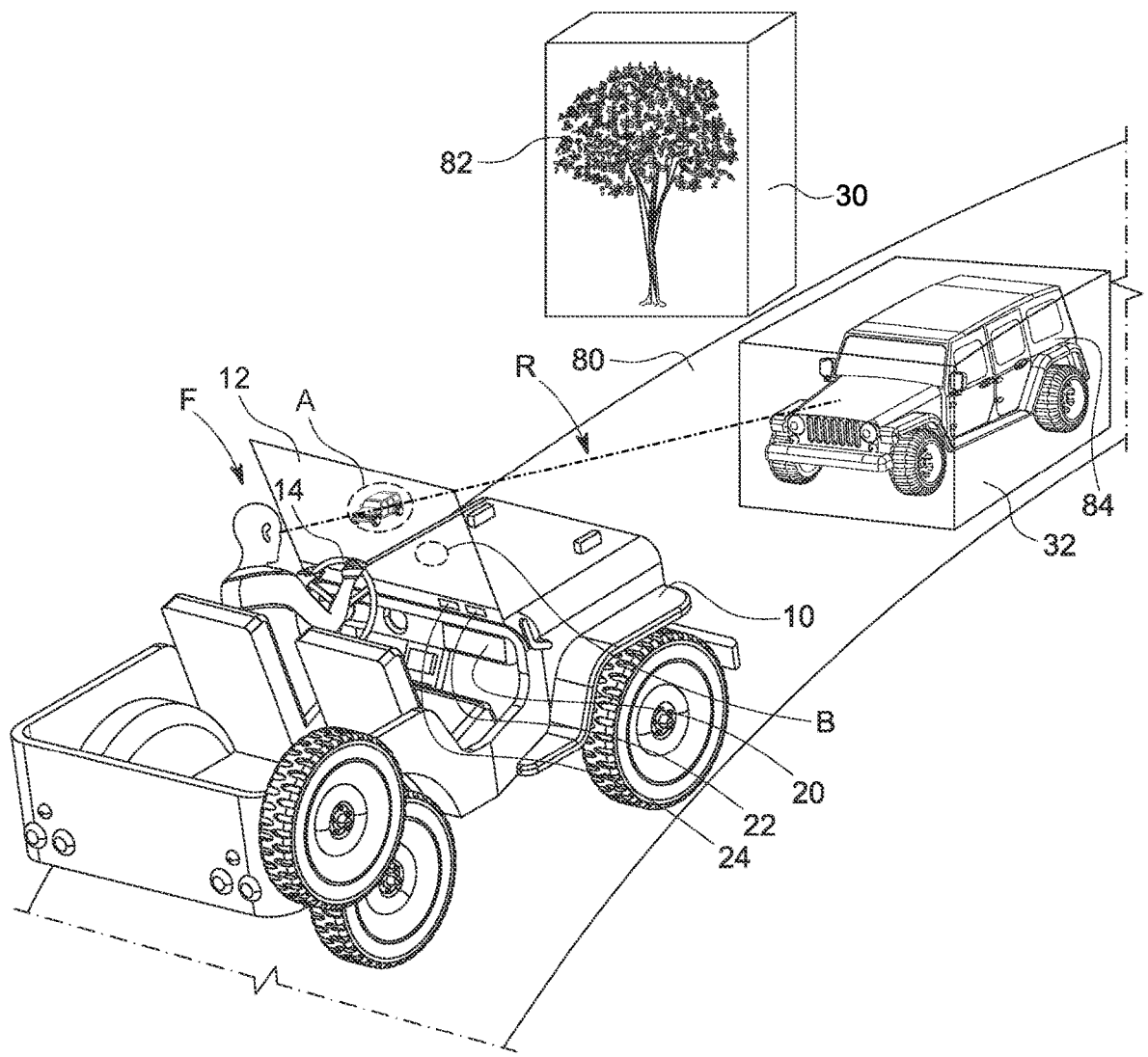
FIG. 1 an exemplary schematic displaying of the mode of operation of a system according to the embodiment of invention for displaying augmented reality information on a front windshield of vehicles, and FIG. 2 an exemplary schematic displaying of the individual steps of a process according to the embodiment of invention.

FIG. 1 shows an exemplary schematic displaying of the mode of operation of a system according to the embodiment of invention for displaying augmented reality information on a windshield 12 of vehicles 10. The system comprises a sensor 24 configured to detect 910 the current viewing direction R of an occupant F (in this case the driver behind the steering wheel 14) in relation to the windshield 12; a computing unit 20 configured to process 900 augmented reality information and to define 1030 and take into account an clearance area A around the current viewing direction R; and a displaying unit 22 configured p to display 940 augmented reality information on the windshield 12. The displaying unit 22 and the sensor 24 are shown here as components independent of each other, which are arranged in the vicinity of the front windshield 12 in the dashboard, as an example. However, the components may also be arranged at any other suitable position on the vehicle 10 (e.g., by being integrated together in a rearview mirror housing). Furthermore, these components may also be provided by an existing strain gauge or other appropriately set up system already integrated into the vehicle 10.

The computing unit 20 can also be configured to use external sensor data to determine 920 an ambient object 82, 84 in the direction of view R and to process this data for an expanded and/or enlarged display as augmented reality information. After detection 910 of the current viewing direction R, a determination 920 of an ambient object 82, 84 lying in the current viewing direction R can thus be carried out. As ambient objects, a tree 82 and an oncoming bus 84 along the course of a road 80 are shown as examples. Since the assignment to individual objects does not have to be unambiguous from the viewing direction, an object detection can preferably first be carried out to represent the individual objects in question in the computing unit 20. Thus, in the displaying shown, the tree 82 leads to a first object detection 30 and the bus 84 to a second object detection 32. By means of a suitable evaluation algorithm or by means of neural networks, for example, the most probable object or the object that is probably to be regarded as most relevant in the viewing direction R can then be selected for an expanded and/or enlarged displaying according to certain criteria. Alternatively or in addition to this, a corresponding selection can also be made via the occupant F.

Figure 2:
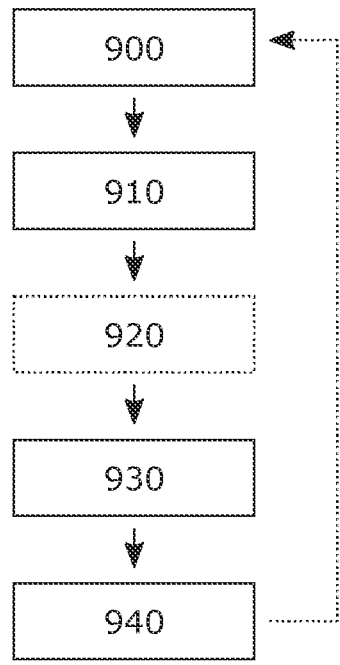

FIG. 2 shows an exemplary schematic displaying of the individual steps of a process according to the embodiment of invention. The flow chart shown in the illustration represents only one possible embodiment of a process sequence and, insofar as the individual process steps do not build on one another, their sequence can be varied as desired.

In the flow chart shown, a processing 900 of augmented reality information for display on the windshield 12 is carried out first. In this context, a processing is understood to mean in particular the compilation and arrangement of the content of the information to be displayed on the windshield 12. Since a renewed processing 900 generally cannot take place continuously, but rather with a sometimes significant time interval between each other, this step is preferably carried out before the other steps of the method according to the embodiment of invention, which can be expected to have a higher repetition rate due to principle. However, reprocessing 900 can also be carried out at another point in the process or, in the case of repeated execution of the process, only as required when the display content changes.

This is followed by detection 910 of the current viewing direction R of an occupant F in relation to the windshield 12. After detection 910, 930 defines a clearance area A of the windshield 12 around the current viewing direction R. This is followed by display 940 of the prepared augmented reality information taking into account the determined clearance area A on the windshield 12. This is followed by displaying 940 the prepared augmented reality information on the windshield 12, taking into account the determined clearance area A. Once this sequence has been completed, the process can be repeated. If the augmented reality information is to remain unchanged in the next run, the processing 900 can be skipped and the display 940 of the prepared augmented reality information need only be carried out taking into account a newly determined clearance area A when detecting 910 any change in the current viewing direction R of an occupant F with respect to the windshield 12.

The detection 910 of the current viewing direction R of an occupant F and/or the definition of an clearance area A of the windshield F can be deactivated. This can be done for example by a digital or analog switching element, via gesture or voice control as well as depending on the situation. In the case of deactivation, for example, a current display 940 of the prepared augmented reality information can be displayed permanently and without further adaptation to the current viewing direction. Deactivating the detection 910 of the current viewing direction R of an occupant F also has the advantage that a corresponding sensor 24 for detection can also be deactivated. The optional interruption or delay in the process sequence is indicated in the illustration by an interrupted feedback arrow.

Preferably, after the detection 910 of the current viewing direction R, a determination 920 of an ambient object 82, 84 located in the current viewing direction R can take place for an expanded and/or enlarged display as augmented reality information. A displaying of the ambient object 82, 84 as augmented reality information can then take place within the clearance area A, within a surrounding area B located in the vicinity of the clearance area A, or on a screen. Preferably, after an augmented and/or enlarged displaying of the ambient object 82, 84, a renewed detection 910 of the current viewing direction R of the occupant F is deactivated for a limited time or can be deactivated. This means that, for example, a digital or analog switching element, gesture or voice control and, depending on the situation, an expanded and/or enlarged displaying of an ambient object 82, 84 located in the current viewing direction R can be used to enable an in-depth view. The deactivation can take place independently of a deactivation of the detection 910 of the current viewing direction R of an occupant F and/or the definition of an clearance area A of the windshield F, so that an expanded and/or enlarged displaying of an ambient object 82, 84 lying in a previous viewing direction R can nevertheless be tracked, for example, into a new clearance area A adapted in the meantime by changing the viewing direction.

LIST OF REFERENCE NUMBERS 10 vehicle
12 front screen
14 steering wheel
20 computing unit
22 displaying unit
24 sensor
30 first object detection
32 second object detection
80 street
82 tree
84 bus
A clearance area
B surrounding area
F occupant (driver)
R current viewing direction
900 preparation of augmented reality information
910 detecting the current viewing direction
920 determining an ambient object lying in the current viewing direction
930 setting a clearance area
940 display of the prepared augmented reality information

The invention claimed is:

1. A method for displaying augmented reality information in vehicles (10), wherein augmentation takes place on a windshield (12) of the vehicle (10), comprising:
while the vehicle is being driven:
preparing (900) augmented reality information for display on the windshield (12);
detecting (910), with a sensor, a current viewing direction (R) of an occupant (F) with respect to the windshield (12);
defining (930) a clearance area (A) of the windshield (12) around the current viewing direction (R); and
displaying (940) the prepared augmented reality information taking into account the defined clearance area (A) on the windshield (12),
wherein after the detection (910) of the current viewing direction (R), a determination (920) of an ambient object (82, 84) located in the current viewing direction (R) for an expanded and/or enlarged displaying as augmented reality information takes place,
wherein a displaying of the ambient object (82, 84) is made as augmented reality information within the clearance area (A), within a surrounding area (B) located in the vicinity of the clearance area (A) or on a screen,
wherein after the displaying of the ambient object (82, 84) and while the vehicle is being driven, deactivating the sensor such that a renewed detection (910) of the current viewing direction (R) of the occupant (F) is deactivated, or can be deactivated for a limited time, while the displayed augmented reality information remains displayed without further adaptation to the current viewing direction (R) of the occupant (F).

2. The method according to claim 1, wherein defining the clearance area (A) of the windshield (12) around the current viewing direction (R) includes determining a size and/or shape depending on the current viewing direction or a situation based on external parameters.

3. The method according to claim 1, wherein within the clearance area (A) no augmented reality information or only augmented reality information presented in dimmed form is displayed.

4. The method according to claim 1, wherein the detection (910) of the current viewing direction (R) of the occupant (F) and/or the definition of a clearance area (A) of the windshield (12) can be deactivated.

5. The method according to claim 1, wherein the displaying of the magnified ambient object (82, 84) masks reality by means of brightness and optional color enhancement or contouring.

* * * * *